United States Patent
Kanth et al.

(10) Patent No.: US 12,131,541 B2
(45) Date of Patent: Oct. 29, 2024

(54) METHOD AND A SYSTEM FOR SPATIO-TEMPORAL POLARIZATION VIDEO ANALYSIS

(71) Applicant: Tata Consultancy Services Limited, Mumbai (IN)

(72) Inventors: Rokkam Krishna Kanth, Bangalore (IN); Akshaya Ramaswamy, Chennai (IN); Achanna Anil Kumar, Bangalore (IN); Jayavardhana Rama Gubbi Lakshminarasimha, Bangalore (IN); Balamuralidhar Purushothaman, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 34 days.

(21) Appl. No.: 18/086,321

(22) Filed: Dec. 21, 2022

(65) Prior Publication Data

US 2023/0215176 A1 Jul. 6, 2023

(30) Foreign Application Priority Data

Jan. 3, 2022 (IN) .............................. 202221000232

(51) Int. Cl.
*G06V 20/40* (2022.01)
*G06V 10/774* (2022.01)
(Continued)

(52) U.S. Cl.
CPC ............ *G06V 20/46* (2022.01); *G06V 10/774* (2022.01); *G06V 10/82* (2022.01); *H04N 23/80* (2023.01)

(58) Field of Classification Search
CPC ...... G06V 20/46; G06V 10/774; G06V 10/82; G06V 10/40; G06V 10/62; G06V 10/764; H04N 23/80
(Continued)

(56) References Cited

U.S. PATENT DOCUMENTS

2017/0178346 A1* 6/2017 Ferro .................... G06N 3/084
2021/0084284 A1 3/2021 Mceldowney

OTHER PUBLICATIONS

Baek et al., "Polarimetric Spatio-Temporal Light Transport Probing," 1(1) (2021).
(Continued)

*Primary Examiner* — Usman A Khan
(74) *Attorney, Agent, or Firm* — Finnegan, Henderson, Farabow, Garrett & Dunner, L.L.P.

(57) ABSTRACT

This relates generally to a method and a system for spatio-temporal polarization video analysis. The spatio-temporal polarization data is analyzed for a computer vision application such as object detection, image classification, image captioning, image reconstruction or image inpainting, face recognition and action recognition. Numerous classical and deep learning methods have been applied on polarimetric data for polarimetric imaging analysis, however, the available pre-trained models may not be directly suitable on polarization data, as polarimetric data is more complex. Further compared to analysis of the polarimetric images, a significant number of actions can be detected by polarimetric videos, hence analyzing polarimetric videos is more efficient. The disclosure is a spatio-temporal analysis of polarization video. The disclosed techniques include configuring a set of parameters from the polarization video to train a spatio-temporal deep network architecture for analyzing polarimetric videos for computer vision applications.

13 Claims, 15 Drawing Sheets

(51) Int. Cl.
*G06V 10/82* (2022.01)
*H04N 23/80* (2023.01)

(58) Field of Classification Search
USPC ..................................................... 348/222.1
See application file for complete search history.

(56) References Cited

OTHER PUBLICATIONS

Nebisoy et al., "Video Action Recognition Using spatio-temporal optical flow video frames," (2021).
Song et al., "Imaging dynamic scenes with a spatio-temporally channeled polarimeter," Optics Express, 27(20) (2019).

\* cited by examiner capturing a plurality of polarization videos using a polarization camera, via one or more hardware processors, wherein the plurality of polarization videos comprises a plurality of pre-defined frames, where each of the plurality of pre-defined frames has a corresponding polarization angle ⟵ 302 extracting a set of parameters from the plurality of videos based on a parameter extraction technique, via the one or more hardware processors, wherein the set of parameters are in a video format comprising an unpolarized intensity video, a stokes vector video, a degree of polarization video, an angle of polarization video ⟵ 304

METHOD AND A SYSTEM FOR SPATIO-TEMPORAL POLARIZATION VIDEO ANALYSIS

PRIORITY CLAIM

This U.S. patent application claims priority under 35 U.S.C. § 119 to: India Application No. 202221000232, filed on Jan. 3, 2022. The entire contents of the aforementioned application are incorporated herein by reference.

TECHNICAL FIELD

The disclosure herein generally relates to polarization video analysis, and, more particularly, to a method and a system for spatio-temporal polarization video analysis.

BACKGROUND

Deep learning has led to significant improvements in computer vision tasks. The computer vision tasks include acquiring, processing, analyzing-understanding, and extraction of high-dimensional data from the real-world digital images for computer vision applications such as object detection, image classification, image captioning, image reconstruction or image inpainting, face recognition and action recognition. Of the several existing techniques for computer vision applications, polarimetric imaging analysis has been extensively applied in several domains including medical imaging and remote sensing applications considering the efficient performance of polarimetric imaging analysis even in challenging environments containing reflective surfaces or transparent objects and in unfavorable weather conditions such as scene analysis in the presence of rain or fog.

Numerous classical and deep learning methods have been frequently applied on polarimetric data for polarimetric imaging analysis to capture meaningful patterns and learn the mapping to downstream tasks. A popularly used deep learning methods is the usage of neural networks with polarized images, however a challenge with the neural network is the use of pre-trained models. However, the available pre-trained models on RGB modality may not be directly suitable on polarization data, as polarimetric data is more complex and is characterized by geometric features and physical properties of objects.

Further compared to analysis of the polarimetric images, a significant number of actions can be detected by polarimetric videos, as the polarimetric videos offer extra information in the form of angles of polarization compared to polarimetric images. The polarimetric images in combination with deep learning is a well-researched problem however there is limited work for polarimetric videos.

SUMMARY

Embodiments of the present disclosure present technological improvements as solutions to one or more of the above-mentioned technical problems recognized by the inventors in conventional systems. For example, in one embodiment, a method for spatio-temporal polarization video analysis is provided. The system includes a memory storing instructions, one or more communication interfaces, and one or more hardware processors coupled to the memory via the one or more communication interfaces, wherein the one or more hardware processors are configured by the instructions to capture a plurality of polarization videos using a polarization camera, via one or more hardware processors, wherein the plurality of polarization videos comprises a plurality of pre-defined frames, where each of the plurality of pre-defined frames has a corresponding polarization angle. The system is further configured to extract a set of parameters from the plurality of polarization videos based on a parameter extraction technique, via the one or more hardware processors, wherein the set of parameters are in a video format comprising an unpolarised intensity video, a stokes vector video, a degree of polarization video and an angle of polarization video; The system is further configured to configure the set of parameters to obtain a configured polarimetric video based on a configuration technique, via the one or more hardware processors, wherein the configured polarimetric video comprises one of a single configuration, a multiple-stacked configuration and a multiple-parallel configuration. The system is further configured to train a spatio-temporal deep network architecture using the configured polarimetric video for a spatio-temporal polarization video analysis, via the one or more hardware processors, wherein the spatio-temporal architecture is a feature extraction network comprising a neural network of a convolutional neural network and a recurrent neural network.

In another aspect, a method for spatio-temporal polarization video analysis is provided. The method includes capturing a plurality of polarization videos using a polarization camera, wherein the plurality of polarization videos comprises a plurality of pre-defined frames, where each of the plurality of pre-defined frames has a corresponding polarization angle. The method further includes extracting a set of parameters from the plurality of polarization videos based on a parameter extraction technique, wherein the set of parameters are in a video format comprising an unpolarised intensity video, a stokes vector video, a degree of polarization video and an angle of polarization video. The method further includes configuring the set of parameters to obtain a configured polarimetric video based on a configuration technique, wherein the configured polarimetric video comprises one of a single configuration, a multiple-stacked configuration and a multiple-parallel configuration; and the method further includes training a spatio-temporal deep network architecture using the configured polarimetric video for a spatio-temporal polarization video analysis, wherein the spatio-temporal architecture is a feature extraction network comprising a neural network of a convolutional neural network and a recurrent neural network.

In yet another aspect, a non-transitory computer readable medium for spatio-temporal polarization video analysis is provided. The program includes capturing a plurality of polarization videos using a polarization camera, wherein the plurality of polarization videos comprises a plurality of pre-defined frames, where each of the plurality of pre-defined frames has a corresponding polarization angle. The program further includes extracting a set of parameters from the plurality of polarization videos based on a parameter extraction technique, wherein the set of parameters are in a video format comprising an unpolarised intensity video, a stokes vector video, a degree of polarization video and an angle of polarization video. The program further includes configuring the set of parameters to obtain a configured polarimetric video based on a configuration technique, wherein the configured polarimetric video comprises one of a single configuration, a multiple-stacked configuration and a multiple-parallel configuration; and the program further includes training a spatio-temporal deep network architecture using the configured polarimetric video for a spatio-temporal polarization video analysis, wherein the spatio-temporal architecture is a feature extraction network comprising a neural network of a convolutional neural network and a recurrent neural network It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3A and FIG. 3B is a flow diagram illustrating a method (300) for spatio-temporal polarization video analysis, by the system of FIG. 1, in accordance with some embodiments of the present disclosure.

DETAILED DESCRIPTION OF EMBODIMENTS

Figure 1:
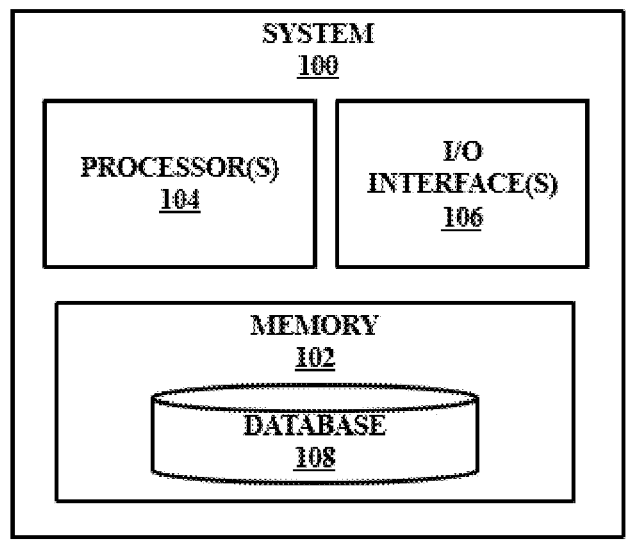
FIG. 1 illustrates an exemplary system for spatio-temporal polarization video analysis according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The spatio-temporal polarization data is analyzed for a computer vision application such as object detection, image classification, image captioning, image reconstruction or image inpainting, face recognition and action recognition. Numerous classical and deep learning methods have been applied on polarimetric data for polarimetric imaging analysis, however, the available pre-trained models may not be directly suitable on polarization data, as polarimetric data is more complex. Further compared to analysis of the polarimetric images, a significant number of actions can be detected by polarimetric videos, hence analyzing polarimetric videos is more efficient. The disclosure is a spatio-temporal analysis of polarization video to be used for a computer vision application. The disclosed techniques include training a spatio-temporal deep network architecture for analyzing polarimetric videos based on configuring a set of parameters from analyzing existing polarization videos.

Referring now to the drawings, and more particularly to FIG. 1 through FIG. 11, where similar reference characters denote corresponding features consistently throughout the figures, there are shown preferred embodiments and these embodiments are described in the context of the following exemplary system and/or method.

FIG. 1 is a functional block diagram of a system 100 for spatio-temporal polarization video analysis in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of the system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 is configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, a network cloud and the like.

The I/O interface(s) 106 can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Further, the memory 102 may include a database 108 configured to include information regarding data associated the computer vision applications. The memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106.

Figure 2A:
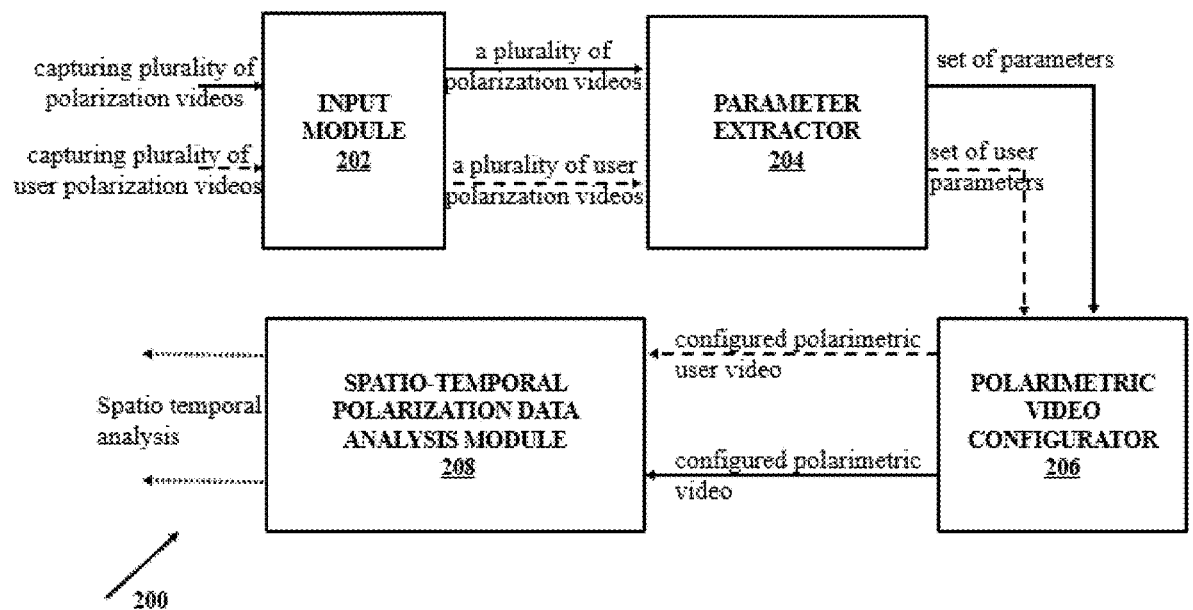
FIG. 2A is a functional block diagram of the system of FIG. 1 for spatio-temporal polarization video analysis according to some embodiments of the present disclosure.

Functions of the components of system 100 are explained in conjunction with functional overview of the system 100 in FIG. 2A and flow diagram of FIGS. 3A-3B, FIGS. 6A-6B and FIGS. 7A-7B for spatio-temporal polarization video analysis.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

FIG. 2A is an example functional block diagram of the various modules of the system of FIG. 1, in accordance with some embodiments of the present disclosure. As depicted in the architecture, the FIG. 2A illustrates the functions of the modules of the system 100 that includes spatio-temporal polarization video analysis.

The system 200 for spatio-temporal polarization video analysis works in two modes—a training mode and a testing mode based on a user requirement. The training phase comprises of training a spatio-temporal deep network architecture for spatio-temporal polarization video analysis. The testing phase comprises of using the trained spatio-temporal deep network architecture for spatio-temporal polarization video analysis. Hence in the training phase the spatio-temporal deep network architecture is generated and trained, and in the testing phase the trained spatio-temporal deep network architecture is used for performing a computer vision application on a user's polarimetric video. The computer vision application comprises of atleast one of an object recognition, an action recognition, a defect identification, an object tracking as requested by the user.

The system 200 for spatio-temporal polarization video analysis is configured for capturing a plurality of polarization videos using a polarization camera in a input module 202, via the one or more hardware processors 104. The system 200 is further configured for configured for extracting a set of parameters from the plurality of polarization videos based on a parameter extraction technique using a parameter extractor 204. The system 200 further comprises a polarimetric video configurator 206 for configuring the set of parameters to obtain a configured polarimetric video based on a configuration technique. The system 200 further comprises a spatio-temporal polarization video analysis module 208 configured for training a spatio-temporal deep network architecture using the configured polarimetric video.

During the testing mode, the input module 202, the parameter extractor 204 and the polarimetric video configurator 206 are used for performing the same function as in training mode for a plurality of user polarization videos. The spatio-temporal polarization video analysis module 208 which comprises the trained a spatio-temporal deep network architecture is utilized for spatio-temporal polarization video analysis. The spatio-temporal polarization video analysis is performed for the computer vision application. The plurality of polarization video level features (generated during the training of the spatio-temporal deep network architecture) is utilized by the trained spatio-temporal deep network architecture for analyzing the configured user polarimetric video for the computer vision application.

Figure 2B:
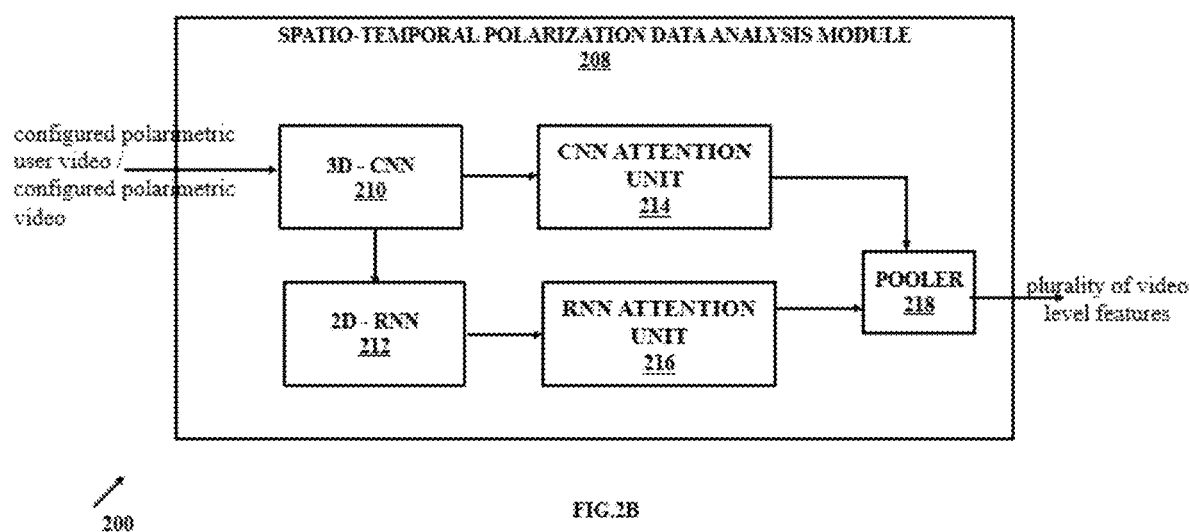
FIG. 2B is a functional block diagram of a trained spatio-temporal deep network architecture of the system of FIG. 1 in accordance with some embodiments of the present disclosure.

An example functional block diagram of the spatio-temporal polarization video analysis module 208 is depicted in the FIG. 2B for the FIG. 2A. As depicted in the architecture, the FIG. 2B illustrates the functions of the modules of the spatio-temporal polarization video analysis module 208 of system 200 for spatio-temporal polarization video analysis.

The spatio-temporal polarization video analysis module 208 comprises a three-dimensional convolutional neural network (3D-CNN) 210 configured for extracting a plurality of spatio-temporal features from the configured polarimetric video. The spatio-temporal polarization video analysis module 208 further comprises a recurrent neural network (2D-RNN) 212 is configured for extracting a plurality of spatio-temporal recurrent features from the plurality of spatio-temporal features. The spatio-temporal polarization video analysis module 208 further comprises a CNN attention unit 214 is configured for extracting a plurality of attention-weighted spatial-temporal features from the plurality of spatio-temporal features. The spatio-temporal polarization video analysis module 208 further comprises a RNN attention unit 216 is configured for extracting a plurality of attention-weighted spatial-temporal recurrent features from the plurality of spatio-temporal recurrent features. The spatio-temporal polarization video analysis module 208 further comprises a Pooler 218, which is a pooling network configured for extracting a plurality of attention-weighted spatial-temporal recurrent features from the plurality of spatio-temporal recurrent features.

The various modules of the system 100 and the functional blocks in FIG. 2A and FIG. 2B are configured for spatio-temporal polarization video analysis and are implemented as at least one of a logically self-contained part of a software program, a self-contained hardware component, and/or, a self-contained hardware component with a logically self-contained part of a software program embedded into each of the hardware component that when executed perform the above method described herein.

Figure 3B:
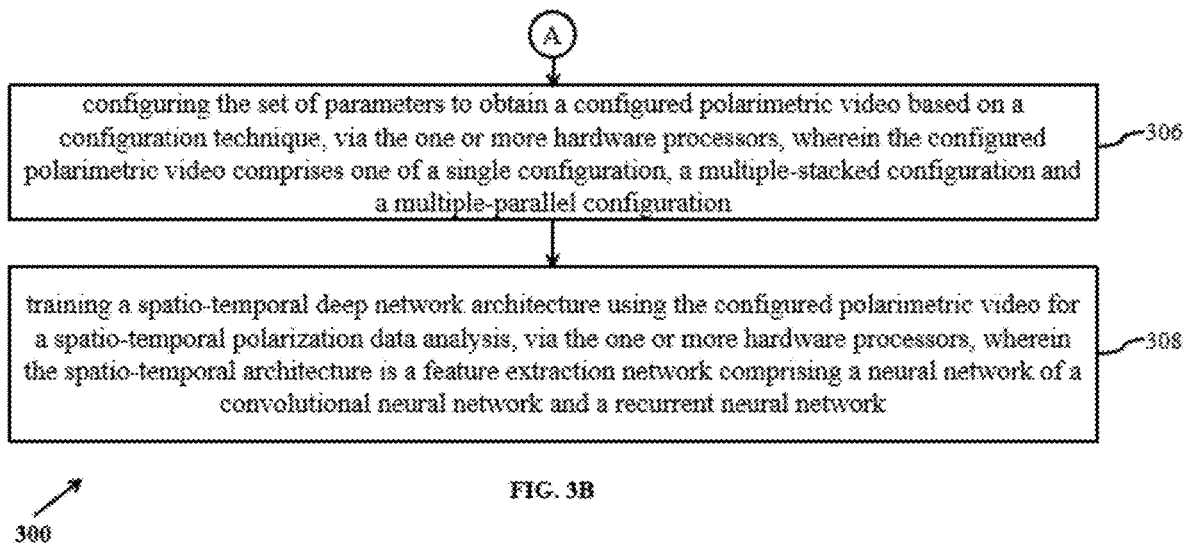

Functions of the components of the system 200 are explained in conjunction with functional modules of the system 100 stored in the memory 102 and further explained in conjunction with flow diagram of FIG. 3A and FIG. 3B. The FIG. 3A and FIG. 3B with reference to FIG. 1, is an exemplary flow diagram illustrating a method 300 for spatio-temporal polarization video analysis using the system 100 of FIG. 1 according to an embodiment of the present disclosure.

The steps of the method of the present disclosure will now be explained with reference to the components of the system (100) for spatio-temporal polarization video analysis and the modules (202-218) as depicted in FIG. 2A and FIG. 2B and the flow diagrams as depicted in FIG. 3A and FIG. 3B. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method (300), a plurality of polarization videos is captured using a polarization camera via the input module 202. The plurality of polarization videos comprises a plurality of pre-defined frames, where each of the plurality of pre-defined frames has a corresponding polarization angle.

In an embodiment, the plurality of polarization videos is captured or acquired using the polarization camera in a controlled environment with a pre-defined illumination setting. The plurality of polarization videos is captured using polarization camera in the pre-defined illumination setting for parameter settings pre-defined for parameters including spatial resolution, frame rate, and duration of video.

Figure 4:
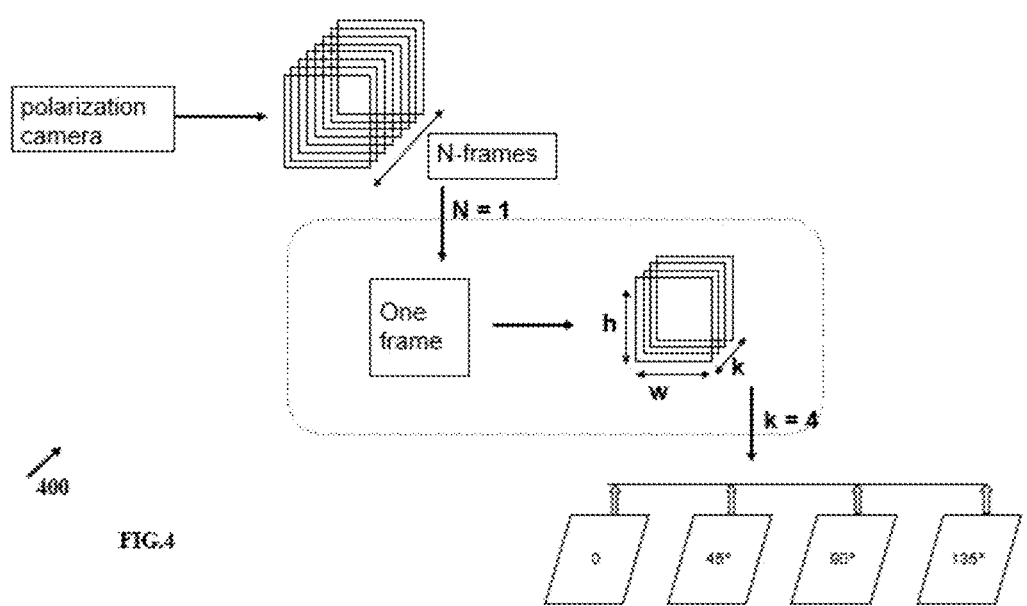
FIG. 4 illustrates a plurality of polarization videos received using a polarization camera for spatio-temporal polarization video analysis according to some embodiments of the present disclosure.

The plurality of polarization videos comprises a plurality of pre-defined frames, where each of the plurality of pre-defined frames has a corresponding polarization angle as shown in FIG. 4. As illustrated in FIG. 4, the plurality of polarization videos comprises N pre-defined frames with a dimension: [N, w, h, k wherein, the pre-defined frames have a spatial resolution of w(width)×h(height) and k represents the number of polarization angles. In an example scenario, the polarization camera continuously captures 25 pre-defined frames in one second with dimension [25, 1232, 1028, 4], and each pre-defined frame has a spatial resolution of 1232×1028, and the last dimension 4 corresponds to four polarization angles [0°, 45°, 90°, 135°].

The plurality of polarization videos captured using the polarization camera can be transferred to a local machine or a server or can be processed within the same module as per user requirement.

At step 304 of the method (300), a set of parameters is extracted from the plurality of polarization videos based on a parameter extraction technique in the parameter extractor 204.

The set of parameters are in a video format comprising an unpolarised intensity ($I_{un}$) video, a stokes vector ($S_i$) video, a degree of polarization (DoP) video and an angle of polarization (AoP) video.

In an embodiment, the parameter extraction technique includes one of frame-wise computation technique and trained deep learning model technique. The criteria for making a selection between the parameter extraction technique and the trained deep learning model technique is based on a parameter extraction technique threshold (v) based on the number plurality of polarization videos received, wherein the v is dynamically decided based on the user requirement for the parameters to be extraction. Based on the parameter extraction technique threshold (v), the frame-wise parameter computation technique is selected if the plurality of polarization videos is below the v while the deep learning parameter estimation model is selected if the plurality of polarization videos exceeds v. In an example scenario, for a set of 200 plurality of polarimetric videos, the frame-wise parameter computation technique is used to extract the set of parameter videos. In another example scenario, for a set of 5000 polarimetric videos, a subset of videos is used to train the deep learning parameter estimation model, and the trained deep learning parameter estimation model is used to compute the parameter videos.

In an embodiment, the parameter computation technique computes each parameter for each of the pre-defined frames in the plurality of polarization videos. In an example scenario, consider a polarimetric video with 25 frames, and each frame with spatial resolution of 1232×1028, and consisting of four stacked images$\{F_0, F_{45}, F_{90}, F_{135}\}$ corresponding to four polarization angles [0°, 45°, 90°, 135°]. The frame-wise parameter computation is described below:

The unpolarised intensity ($I_{un}$) is computed for each frame ($F_{un}$) as shown below:

$$F_{un} = \{F_0 + F_{45} + F_{90} + F_{135}\}/2 \tag{1}$$

The stokes vector ($S_i$) video, wherein Stokes vector video has 3 channels is expressed as:

$$\{S_j\} = \{S_0, S_1, S_2\} \tag{2}$$

wherein, $$S_0 = (F_0 + F_{90})$$

$$S_1 = (F_0 - F_{90})$$

$$S_2 = (F_{45} - F_{135})$$

The degree of polarization (DoP) video is computed and expressed as shown below:

$$DoP = \frac{\sqrt{S_1^2 + S_2^2}}{S_0} \tag{3}$$

The angle of polarization (AoP) video is computed and expressed as shown below:

$$AoP = \frac{1}{2}\tan^{-1}\left[\frac{S_2}{S_1}\right] \tag{4}$$

In another embodiment, the plurality of parameter videos are extracted from the plurality of polarization videos using a trained deep parameter estimation model, wherein the deep parameter estimation model is pre-trained using equations 1 to equation 4 to estimate each of the plurality of the parameter videos using minimization of one of more of mean squared error loss function and cosine loss function. The deep parameter estimation model consists of a plurality of three-dimensional convolution layers with residual connections and maxpool layers.

At step 306 of the method (300), the set of parameters are configured to obtain a configured polarimetric video based on a configuration technique in a polarimetric video configurator 206. The configured polarimetric video comprises one of a single configuration, a multiple-stacked configuration and a multiple-parallel configuration.

Figure 5:
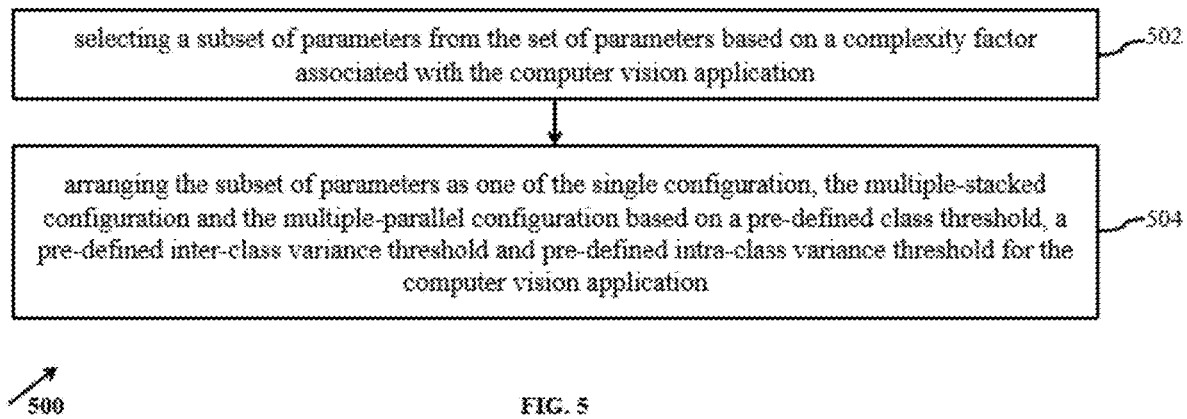
FIG. 5 is a flow diagram illustrating a method (500) for the configuration technique for spatio-temporal polarization video analysis, by the system of FIG. 1, according to some embodiments of the present disclosure.

In an embodiment, the configuration technique is explained using the FIG. 5 as described below:

At step 502 of the method (500), a subset of parameters is selected from the set of parameters based on a complexity factor associated with the computer vision application.

In an embodiment, subset of parameters is selected from the set of parameters based on a complexity factor, wherein the complexity factor associated with the computer vision application. The sub-set is selected from among the set of parameters are in a video format. The subset of parameters is selected in a singularity or in a combination along with the plurality of polarization videos. The several possible combinations are selected either singularly or as a multiple combination of the parameters, as shown below:

(a) Singularly of subset of parameters:

$$V_{Iun} \text{ or } V_{raw} \text{ or } V_{stokes} \text{ or } V_{pol} \quad (5)$$

(b) Multiple combination of subset of parameters: (6)

$$V_{raw} + V_{pol}$$

$$V_{raw} + V_{stokes}$$

$$V_{raw} + V_{pol} + V_{stokes}$$

wherein:
$V_{Iun}$: Video of unpolarised intensity ($I_{un}$),
$V_{raw}$: Video of plurality of polarization video (input),
$V_{stokes}$: Video of Stokes vector [$S_0$, $S_1$, $S_2$] and
$V_{pol}$: Video of three channel as [AoP, DoP, $I_{un}$].

One subset of parameters (in a combination or singularly) is selected based on the complexity factor associated with the computer vision application, wherein the complexity factor is dynamically determined for the computer vision application based on a user requirement. In an example scenario, for the application of object recognition and action recognition, the raw video is chosen. In another example scenario, defect detection applications, the stokes vector video and degree of polarization video are selected. In another example scenario, for the comparison with standard camera with RGB (red-green-blue) or grayscale modality, the unpolarized intensity video is used.

In an example the single input configuration (of just one of unpolarised intensity ($I_{un}$) video, a stokes vector ($S_i$) video, a degree of polarization (DoP) video and an angle of polarization (AoP)) is with raw video input is chosen for the computer vision application of coarse action classification into 12 classes.

At step 504 of the method (500), the subset of parameters is arranged as one of the single configuration, the multiple-stacked configuration and the multiple-parallel configuration based on a pre-defined class threshold, a pre-defined inter-class variance threshold and pre-defined intra-class variance threshold for the computer vision application.

In an embodiment, the pre-defined class threshold, the pre-defined inter-class variance threshold and the pre-defined intra-class variance threshold are set dynamically based the computer vision application as required by the user.

Figure 6A:
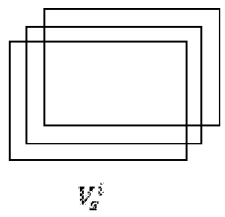
FIGS. 6A, FIG. 6B and FIG. 6C illustrate different configurations of a polarimetric video, according to some embodiments of the present disclosure.

Single configuration: A single configuration comprises of a uniform configuration of a singular subset of parameters (or $V_{stokes}$ or $V_{pol}$). As illustrated in FIG. 6A, the single configuration ( ) comprises of a uniform configuration of one of $$V_s^i = V_{Iun} \text{ or } V_{raw} \text{ or } V_{stokes} \text{ or } V_{pol} \quad (7)$$

In an example scenario, for computer vision application such as a coarse action recognition application with number of classes less than a pre-defined class threshold, inter-class variance metric higher than the pre-defined inter-class variance threshold and intra-class variance metric lower than the pre-defined intra-class variance threshold, the configuration selected is the single input configuration.

Multiple-stacked configuration: A multiple-stacked configuration comprises of a combination of one or more subset of parameters($V_s^i$, $V_s^j$):

$$V_{raw} + V_{pol} \quad (8)$$

$$V_{raw} + V_{stokes}$$

$$V_{raw} + V_{pol} + V_{stokes}$$

Figure 6B:
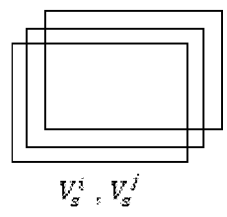

As illustrated in FIG. 6B, the multiple-stacked configuration comprises of a combination of configuration. In another example scenario, for a computer vision application such as a object recognition application with number of classes greater than a pre-defined class threshold, or inter-class variance metric lower than a pre-defined inter-class variance threshold or intra-class variance metric higher than a pre-defined intra-class variance threshold the configuration selected is the multiple-stacked input configuration.

Multiple-parallel configuration: A multiple-stacked configuration comprises of a combination of one or more subset of parameters in parallel, wherein similar parameters are stacked and arranged in a parallel configuration.

Figure 6C:
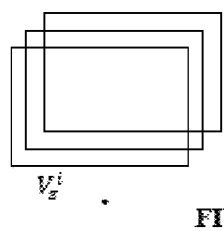
Figure 6C:
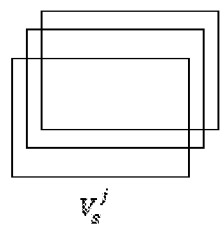

As illustrated in FIG. 6C, the multiple-parallel configuration comprises of a combination of configuration ($V_s^i$, $V_s^j$) in parallel configuration. In another example scenario, for a computer vision application such as a fine-grained action recognition application with number of classes greater than a pre-defined class threshold, and inter-class variance metric lower than a pre-defined inter-class variance threshold and intra-class variance metric higher than a pre-defined intra-class variance threshold, the configuration selected is the multiple-parallel input configuration.

Referring to FIG. 3A and FIG. 3B, the step 308 of the method (300), a spatio-temporal deep network architecture is trained at the spatio-temporal polarization video analysis module 208. The spatio-temporal deep network architecture is trained using the one or more configured polarimetric videos for a spatio-temporal polarization video analysis. The spatio-temporal architecture is a feature extraction network comprising a neural network of a convolutional neural network and a recurrent neural network.

Figure 7A:
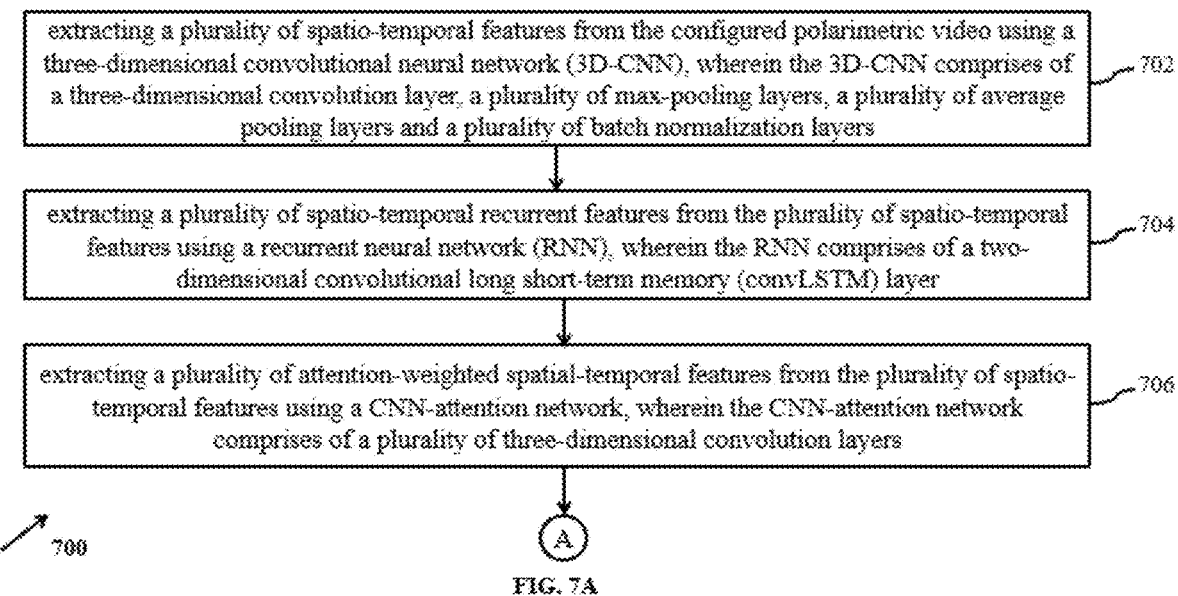
FIG. 7A and FIG. 7B is a flow diagram of a method (700) for training a spatio-temporal deep network architecture for a spatio-temporal polarization video analysis by the system of FIG. 1, in accordance with some embodiments of the present disclosure.
Figure 7B:
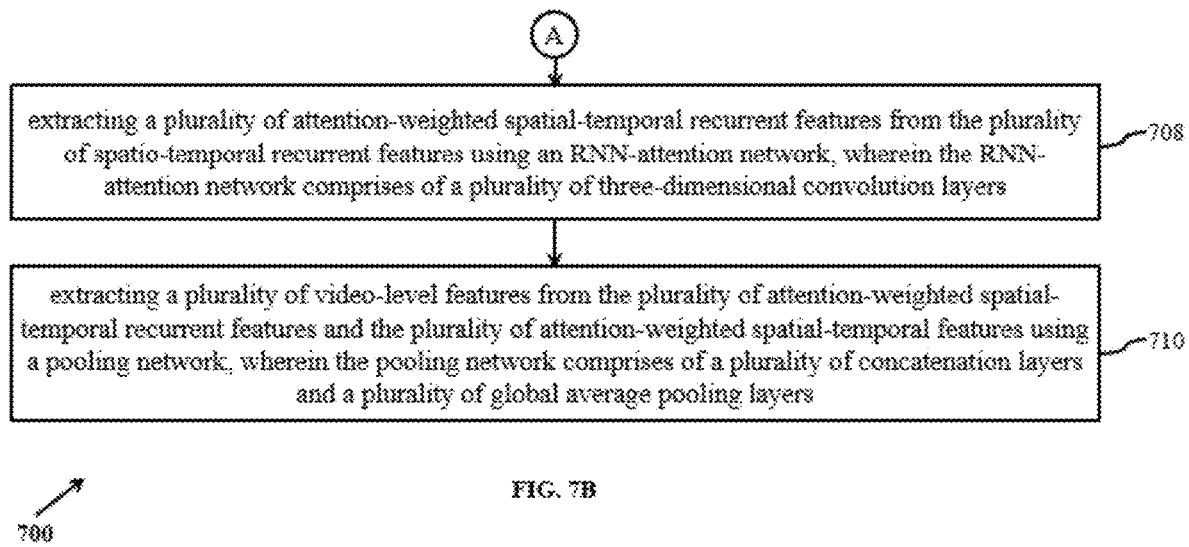

In an embodiment, the method for training the spatio-temporal deep network architecture for a spatio-temporal polarization video analysis is explained using flowchart of 700 as depicted in FIG. 7A and FIG. 7B. The training of the spatio-temporal deep network architecture comprises:

At step 702 of the method (700), a plurality of spatio-temporal features is extracted at the 3D CNN 210. The plurality of spatio-temporal features is extracted from the configured polarimetric video. The 3D-CNN comprises of a plurality of three-dimensional convolution layers, a plurality of max-pooling layers, a plurality of average pooling layers and a plurality of batch normalization layers.

In an embodiment, the plurality of spatio-temporal features is extracted in several steps including passing the configured polarimetric video as input through multiple three-dimensional convolution layers with a leaky rectified linear unit activation and using multiple filters to capture the distinct properties in each frame of video input, and a set of maxpool layers to reduce the spatial dimension, and batch normalization layers to finally extract the set of spatio-temporal features.

At step 704 of the method (700), a plurality of spatio-temporal recurrent features is extracted from the plurality of spatio-temporal features at the 2D RNN 212. The 2D RNN 212 comprises of a plurality of two-dimensional convolutional long short-term memory (convLSTM) layers, a plurality of max-pooling layers, a plurality of average pooling layers and a plurality of batch normalization layers.

In an embodiment, the plurality of spatio-temporal recurrent features is extracted in several steps including passing the plurality of spatio-temporal features as input through multiple two-dimensional convolutional long short-term memory (convLSTM) layers and extracting all the intermediate outputs to capture the temporal properties in the video and a set of maxpool layers to reduce the spatial dimension, and batch normalization layers to finally extract the set of spatio-temporal recurrent features.

At step 706 of the method (700), a plurality of attention-weighted spatial-temporal features is extracted from the plurality of spatio-temporal features at the CNN attention unit 214. The CNN-attention unit 214 comprises of a plurality of three-dimensional convolution layers.

In an embodiment, the plurality of attention-weighted spatial-temporal features is extracted in several steps including passing the spatio-temporal features through max-pool and average pooled layers. Further the outputs of max-pool and average pooled layers is concatenated and the concatenated output is passed through a three-dimensional convolution layer with sigmoid activation and using one filter to capture spatial attention weights. Finally, the attention-weighted spatial-temporal features is extracted by taking product between the obtained spatial attention weights and spatio-temporal features.

At step 708 of the method (700), a plurality of attention-weighted spatial-temporal recurrent features is extracted from the plurality of spatio-temporal recurrent features using the RNN-attention unit 216. The RNN-attention unit 216 comprises of a plurality of three-dimensional convolution layers.

In an embodiment, the plurality of attention-weighted spatial-temporal recurrent features is extracted in several steps including passing the spatio-temporal recurrent features through max-pool and average pooled layers. Then concatenate the outputs of max-pool and average pooled layers and the concatenated output is passed through a three-dimensional convolution layer with sigmoid activation and using one filter to capture spatial attention weights. Finally, the attention-weighted spatial-temporal recurrent features is extracted by taking product between the obtained spatial attention weights and spatio-temporal recurrent features.

At step 710 of the method (700), a plurality of polarization video-level features is extracted at the pooler 218.

The plurality of polarization video-level features is extracted in several steps wherein the plurality of polarization video-level features is extracted from a plurality of pooled features. The plurality of pooled features is extracted from the plurality of attention-weighted spatial-temporal recurrent features and the plurality of attention-weighted spatial-temporal features using a pooling network. The pooling network comprises of a plurality of concatenation layers and a plurality of global average pooling layers.

In an embodiment, the plurality of pooling features is extracted in several steps including using a global average pooling layer to flatten the plurality of attention-weighted spatial-temporal recurrent features and a global average pooling layer to flatten the plurality of attention-weighted spatial-temporal features, followed by a concatenation layer to concatenate the flattened set of features. Further the plurality of polarization video-level features is extracted from the plurality of pooled features using a classifier network. The classifier network consists of a plurality of fully connected layers.

The plurality of polarization video-level features is utilized during the training mode for analyzing the configured user polarimetric video for the computer vision application.

Figure 8A:
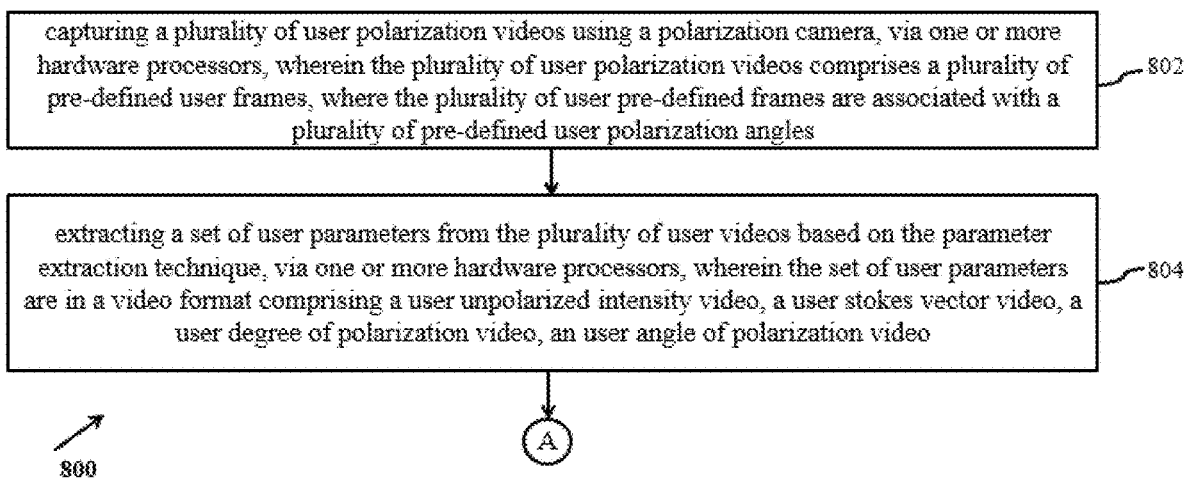
FIG. 8A and FIG. 8B is a flow diagram a method (800) for spatio-temporal polarization video analysis using the trained spatio-temporal deep network architecture, by the system of FIG. 1, in accordance with some embodiments of the present disclosure.
Figure 8B:
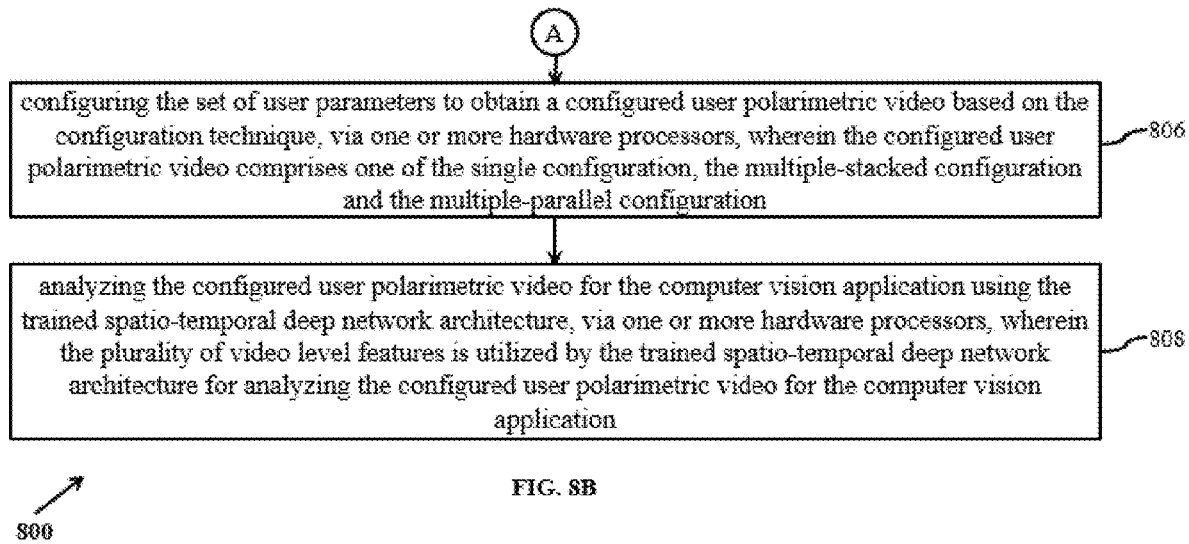

In an embodiment, the training mode of the system 100 for the spatio-temporal polarization video analysis using the trained spatio-temporal deep network architecture for a computer vision application is explained using flowchart of 800 as depicted in FIG. 8A and FIG. 8B for spatio-temporal polarization video analysis comprises:

At step 802 of the method (800), capturing a plurality of user polarization videos using the polarization camera in the input module 202. The plurality of user polarization videos comprises the plurality of pre-defined user frames, where the plurality of user pre-defined frames is associated with the plurality of pre-defined user polarization angles.

In an embodiment, the plurality of polarization user videos is captured or acquired using the polarization camera in a controlled environment with a pre-defined illumination setting. The plurality of polarization user videos is captured using polarization camera in the pre-defined illumination setting for parameter settings pre-defined for parameters including spatial resolution, frame rate, and duration of video.

The plurality of polarization user videos comprises the plurality of pre-defined user frames, similar to the plurality of polarization videos where each of the plurality of pre-defined frames has a corresponding polarization angle as shown in FIG. 4. As illustrated in FIG. 4, the plurality of polarization videos comprises N pre-defined frames with a dimension: [N, w, h, k] wherein, the pre-defined frames have a spatial resolution of w (width)×h (height) and k represents the number of polarization angles. In an example scenario, the polarization camera continuously captures four pre-defined frames corresponding to four polarization angles [0°, 45°, 90°, 135°]. In an example scenario, the polarization camera continuously captures 25 pre-defined frames in one second with dimension [25, 1232, 1028, 4], and each pre-defined frame has a spatial resolution of 1232×1028, and the last dimension 4 corresponds to four polarization angles [0°, 45°, 90°, 135°].

Figure 9:
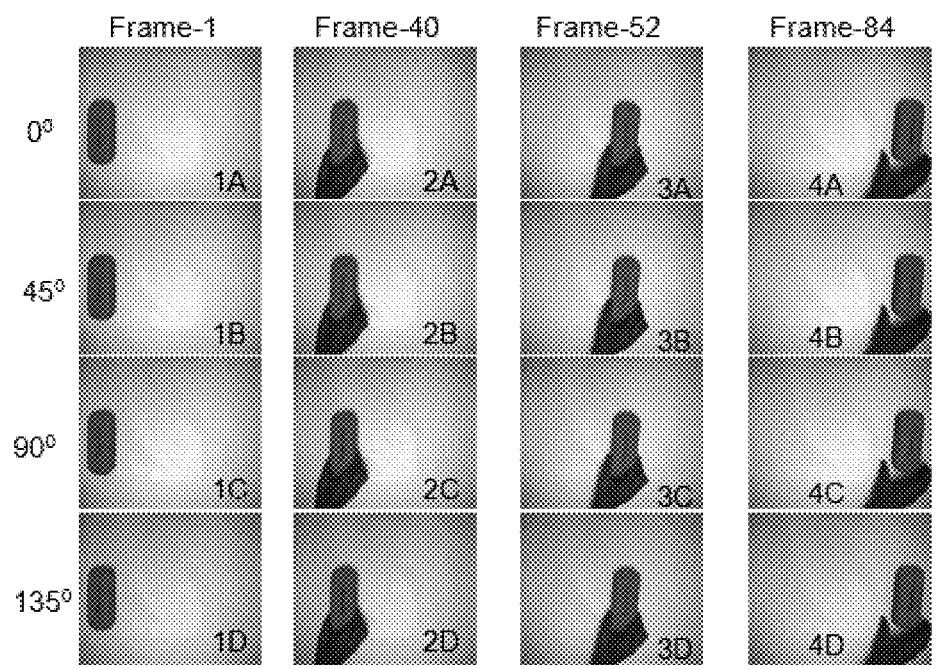
FIG. 9 illustrates registered frames sampled from a polarization video corresponding to four polarization angles for a spatio-temporal polarization video analysis, by the system of FIG. 1, in accordance with some embodiments of the present disclosure.

In an example scenario the user polarization videos are acquired using a grayscale polarization camera. The camera provides frames corresponding to four polarization angles [0°, 45°, 90°, 135°]. The data is transferred from the camera to a local machine over GigE Ethernet. Each video is captured at twenty frames per second, with spatial resolution of (1232×1028). The duration of each video ranges from six seconds to fifteen seconds depending on the action performed by user. The user videos are captured for seven fine grained actions including: 1. moving something from left to right; 2. moving something from right to left; 3. moving something up; 4. moving something away from camera; 5. moving something towards camera; 6. placing something; and 7. removing something. The FIG. 9 illustrates the 4 stacked images corresponding to the four polarization angles, for four specific frames in a user video for the action 'Moving something from left to right'.

At step 804 of the method (800), a set of user parameters is extracted from the plurality of user videos based on the parameter extraction technique in the parameter extractor 204. The set of user parameters are in a video format comprising a user unpolarised intensity ($I_{un}$) video, a user stokes vector ($S_i$) video, a user degree of polarization (DoP) video and a user angle of polarization (AoP) video.

The set of user parameters are in a video format comprises an unpolarised intensity ($I_{un}$) video, a stokes vector ($S_i$) video, a degree of polarization (DoP) video and an angle of polarization (AoP) video.

In an embodiment, the parameter extraction technique for extracting the set of user parameters is the same as the parameter extraction technique for extracting the set of parameters. The parameter extraction technique includes one of frame-wise computation technique and trained deep learning model technique. The criteria for choosing a parameter extraction technique is based on a parameter extraction technique threshold based on the number plurality of polarization videos received, wherein the is dynamically decided based on the user requirement. In an example scenario, for a set of 200 plurality of polarimetric videos, the frame-wise parameter computation technique is used to extract the set of parameter videos. In another example scenario, for a set of 5000 polarimetric videos, a subset of videos is used to train the deep learning parameter estimation model, and the trained deep learning parameter estimation model is used to compute the parameter videos.

The parameter extraction technique for extracting the set of user parameters are in a video format would be the same as discussed using equation 1 to 4.

In another embodiment, the plurality of parameter videos are extracted from the plurality of polarization videos using a trained deep parameter estimation model, wherein the deep parameter estimation model is pre-trained using equations 1 to equation 4 to estimate each of the plurality of the parameter videos using minimization of one of more of mean squared error loss function and cosine loss function. The deep parameter estimation model consists of a plurality of three-dimensional convolution layers with residual connections and maxpool layers.

At step 806 of the method (800), the set of user parameters is configured to obtain a configured user polarimetric video based on the configuration technique in the polarimetric video configurator 206. The configured user polarimetric video comprises one of the single configuration, the multiple-stacked configuration and the multiple-parallel configuration.

In an embodiment, is the configuration selected based on the trained spatio-temporal deep network architecture in the spatio-temporal polarization video analysis module 208. The configuration selected during the training mode is used to obtain the configured user polarimetric video, wherein if the training mode used a single configuration, the single configuration is used to obtain the configured user polarimetric video.

At step 808 of the method (800), the configured user polarimetric video is analyzed for the computer vision application using the trained spatio-temporal deep network architecture in the spatio-temporal polarization video analysis module 208. The plurality of polarization video level features is utilized by the trained spatio-temporal deep network architecture for analyzing the configured user polarimetric video for the computer vision application.

In an embodiment, the video-level features are analyzed for the computer vision application by:
(a) classification of the user's polarimetric video into one or more of a plurality of pre-defined classes, using the trained spatio-temporal deep network architecture, and
(b) visualization of the classification by generating a plurality of activation maps representing a plurality of activation regions localized by the trained spatio-temporal deep network architecture for the computer vision application.

In an example scenario, for the application of action recognition, the video-level features are analyzed by:
a) classification of the user's polarimetric video using the trained spatio-temporal deep network architecture into one ore more of a plurality of pre-defined action classes, and
(b) visualization of the classification by generating a plurality of activation maps representing a plurality of action regions localized by the trained spatio-temporal deep network architecture in the user's polarimetric video.

The plurality of activation maps representing a plurality of activation regions in the user's polarimetric video is generated using one of a plurality of techniques such as class activation map (CAM) generation technique and gradient class activation map (Grad-CAM) technique.

In an example scenario, for the selection of single-input configuration and raw polarimetric video of size [25, 1232, 1028, 4] as selected input, the configured polarimetric video is the raw polarimetric video with dimensions In an example scenario, for the selection of multiple-stacked configuration, and given raw polarimetric video of size [25, 1232, 1028, 4] and Stokes vector video of size [25, 1232, 1028, 3] as selected inputs, the configured polarimetric video is the stacked video combining the raw polarimetric video and Stokes vector video with dimensions [25, 1232, 1028, 7]

In an example scenario, for the selection of multiple-parallel configuration, and given raw polarimetric video of size [25, 1232, 1028, 4] and Stokes vector video of size [25, 1232, 1028, 3] as selected inputs, the configured polarimetric videos are the raw polarimetric video and the Stokes vector video.

Each configured polarimetric video for a user input video is provided as input to the spatio-temporal deep network architecture, and the plurality of video-level features are fused to compute the final video-level features using one of the plurality of fusion techniques consisting of concatenation, averaging operation and maximum operation.

Further the spatio-temporal polarization video analysis is displayed on the I/O interface(s) 106.

Experiments

In an experiment setup, the spatio-temporal deep network architecture is trained to evaluate the spatial baseline $N_S$ and the spatio-temporal baseline $N_{st}$ with the designed input configurations on a Fine-Grained Actions (FGA) dataset. The trained spatio-temporal deep network architecture is trained using a softmax cross entropy loss function and a stochastic gradient descent optimizer. An initial learning rate of 0.0001 is used, and the network is trained for 25 epochs. Three performance metrics are computed: Top-1 accuracy, Macro accuracy and F1-score. The Top-K accuracy metric indicates the percentage of correctly detected action classes among the top K classes of the network detection. Macro-accuracy is the average class-wise accuracy and gives equal importance to all the classes. Table 1 shows the performance comparison for the different input configurations:

TABLE 1

Comparison of performances

| Input Configuration | Input type | No of parameters | Top-1 Accuracy | Macro-accuracy | F1-score |
|---|---|---|---|---|---|
| Single frame input to $N_s$ | $F_{raw}$ | 0.59M | 0.72 | 0.72 | 0.71 |
| single video input to $N_{st}$ | $V_{un}$ | 1.75M | 0.75 | 0.75 | 0.75 |
|  | $V_{raw}$ |  | 0.86 | 0.87 | 0.87 |
|  | $V_{stokes}$ |  | 0.8 | 0.81 | 0.81 |
|  | $V_{pol}$ |  | 0.72 | 0.72 | 0.72 |
| Multi-input video as stacked channel to $N_{st}$ | $V_{raw}$ + $V_{pol}$ | 3.5M | 0.73 | 0.73 | 0.72 |
|  | $V_{raw}$ + $V_{stokes}$ |  | 0.88 | 0.89 | 0.89 |

TABLE 1-continued

Comparison of performances

| Input Configuration | Input type | No of parameters | Top-1 Accuracy | Macro-accuracy | F1-score |
|---|---|---|---|---|---|
| | $V_{raw}$ + $V_{pol}$ + $V_{stokes}$ | | 0.82 | 0.82 | 0.8 |
| Multi-input video to parallel $N_s$ branches | $V_{raw}$ \| $V_{pol}$ | 5.25M | 0.96 | 0.96 | 0.96 |
| | $V_{raw}$ \| $V_{stokes}$ | | 0.95 | 0.95 | 0.95 |
| | $V_{raw}$ \| $V_{pol}$ \| $V_{stokes}$ | | 0.99 | 0.99 | 0.99 |

The first row indicates a spatial input with a single frame $F_{raw}$ as input. All other rows are for a video input of 32 frames evenly sampled from the entire duration of a video. A row indicates unpolarized input $V_{un}$. The following observations were made:

(a) In the single-input scenario, $V_{raw}$ gives the best classification performance with an improvement of more than 10% as compared to the unpolarized input $V_{un}$. $V_{pol}$ results in a sub-optimal performance. This can be attributed to the structure of $V_{pol}$ wherein AoP, DoP and $V_{un}$ are stacked to form a three-channel input. This arrangement does not exploit the advantages offered by each input type, and hinders the capture of useful features;

(b) In the channel-wise stacking of multiple parameters, the combination of $V_{raw}$ and $V_{stokes}$ gives the best results with a Top-1 accuracy of 88% and an F1-score of 87%. Again, the presence of $V_{pol}$ could be the cause of lower performance in the other two input cases; and (c) In the parallel input configuration, the first thing to note is that the number of parameters increase considerably due to the design of separate branches for each input. All three input combinations give very high accuracies.

The learning from the above experiment has been utilized to develop the spatio-temporal architecture for polarimetric feature extraction. The FIG. 9 illustrates registered frames sampled from a polarization video corresponding to four polarization angles. The FIG. 9 shows four frames of a user video captured for the action 'Moving something from left to right'. Each column represents one frame consisting of four images corresponding to the four polarization angles [0, 45, 90, 135], wherein the sub-figures with 1A-1D in FIG. 9 shows the images for first frame, sub-figures with 2A-2D in FIG. 9 shows the images for frame number 40, the sub-figures with 3A-3D in FIG. 9 shows the images for frame number 52, the sub-figures with 4A-4D in FIG. 9 shows the images for frame number 84.

Figure 10:
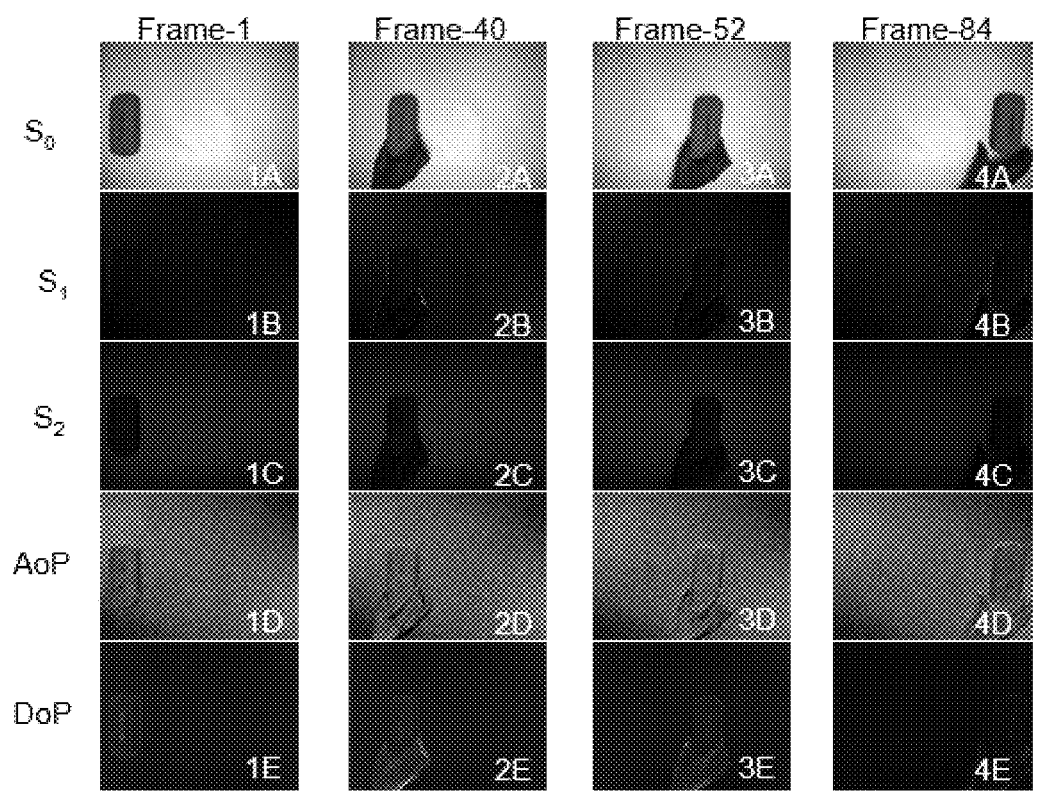
FIG. 10 illustrates the set of parameters of a polarization video input for a spatio-temporal polarization video analysis in accordance with some embodiments of the present disclosure.

Further the FIG. 10 illustrates the set of parameters of a polarization video input for a spatio-temporal polarization video analysis. Each column represents one frame and each row represents a parameter. The sub-figures with-in FIG. 10 of 1A, 2A, 3A and 4A show the Stokes parameter S0 for frames 1, 40, 52 and 84 respectively. The sub-figures with-in FIG. 10 of 1B, 2B, 3B and 4B show the Stokes parameter 51 for frames 1, 40, 52 and 84 respectively, the sub-figures with-in FIG. 10 of 1C, 2C, 3C and 4C show the Stokes parameter 51 for frames 1, 40, 52 and 84 respectively, the sub-figures with-in FIG. 10 of 1D, 2D, 3D and 4D show the Angle of Polarization parameter AoP for frames 1, 40, 52 and 84 respectively and the sub-figures with-in FIG. 10 of 1E, 2E, 3E and 4E show the Angle of Polarization parameter AoP for frames 1, 40, 52 and 84 respectively.

Figure 11:
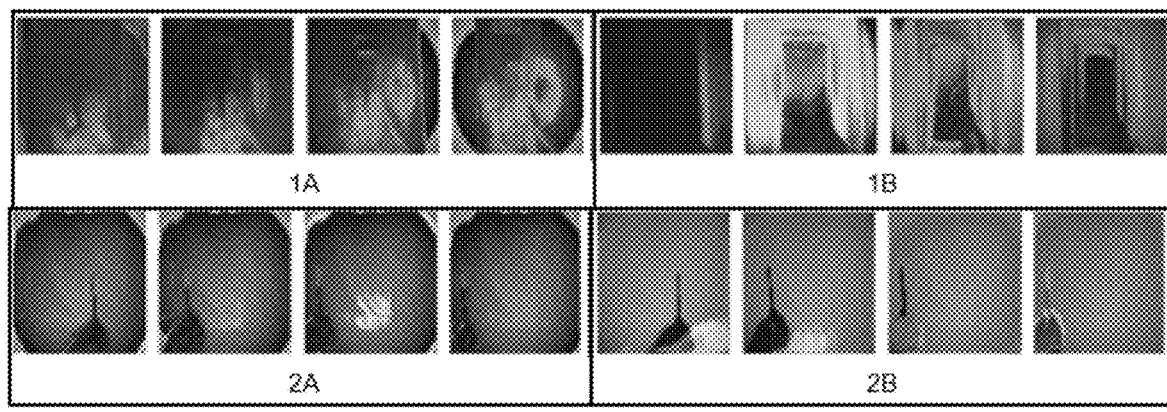
FIG. 11 illustrates a plurality of class activation maps for actions for a spatio-temporal polarization video analysis by the system of FIG. 1, in accordance with some embodiments of the present disclosure.

The FIG. 11 illustrates a class activation maps for actions from HumanAct12 dataset for "eat and jump" action; From the FGA dataset: "Moving away from camera and Right to left" action, using (A) unpolarized input, and using (B) polarized input. The FIG. 11 illustrates the activation maps extracted using the trained deep model for action recognition, for two user videos containing actions 'Moving something away from camera' and 'Move something from right to left'. The sub-figures within FIG. 11—the 1A and 2A show the activation maps using the unpolarized intensity parameter video as input, where it can be observed that the action as well as the action object is not highlighted for both the actions. So without the polarization information, the deep model is unable to learn the action effectively. Further the sub-figures within FIGs. 11-1B and 2B show the activation maps using the raw polarimetric video as input, where it can be clearly seen, that the action and the object regions get activated well, and the deep model is able to capture the motion and identify the action correctly.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein provide a solution to address a problem of spatio-temporal polarization video analysis. The spatio-temporal polarization data is analyses for a computer vision application such as object detection, image classification, image captioning, image reconstruction or image inpainting, face recognition and action recognition. Numerous classical and deep learning methods have been applied on polarimetric data for polarimetric imaging analysis, however, the available pre-trained models may not be directly suitable on polarization data, as polarimetric data is more complex. Further compared to analysis of the polarimetric images, a significant number of actions can be detected by polarimetric videos, hence analyzing polarimetric videos is more efficient. The disclosure is a spatio-temporal analysis of polarization video. The disclosed techniques include configuring a set of parameters from the polarization video to train a spatio-temporal deep network architecture for analyzing polarimetric videos for computer vision applications.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for spatio-temporal polarization video analysis comprising:
   capturing a plurality of polarization videos using a polarization camera, via one or more hardware processors, wherein the plurality of polarization videos comprises a plurality of pre-defined frames, where each of the plurality of pre-defined frames has a corresponding polarization angle;
   extracting a set of parameters from the plurality of polarization videos based on a parameter extraction technique, via the one or more hardware processors, wherein the set of parameters are in a video format comprising an unpolarised intensity ($I_{un}$) video, a stokes vector ($S_i$) video, a degree of polarization (DoP) video and an angle of polarization (AoP) video;
   configuring the set of parameters to obtain a configured polarimetric video based on a configuration technique, via the one or more hardware processors, wherein the configured polarimetric video comprises one of a single configuration, a multiple-stacked configuration and a multiple-parallel configuration; and
   training a spatio-temporal deep network architecture using the configured polarimetric video for a spatio-temporal polarization video analysis, via the one or more hardware processors, wherein the spatio-temporal architecture is a feature extraction network comprising a neural network of a convolutional neural network and a recurrent neural network.

2. The method of claim 1, wherein the spatio-temporal deep network architecture is trained for spatio-temporal polarization video analysis to obtain a trained spatio-temporal deep network architecture, wherein the training comprises:
   extracting a plurality of spatio-temporal features from the configured polarimetric video using a three-dimensional convolutional neural network (3D-CNN), wherein the 3D-CNN comprises of a three-dimensional convolution layer, a plurality of max-pooling layers, a plurality of average pooling layers and a plurality of batch normalization layers;
   extracting a plurality of spatio-temporal recurrent features from the plurality of spatio-temporal features using a recurrent neural network (RNN), wherein the RNN comprises of a two-dimensional convolutional long short-term memory (convLSTM) layer;
   extracting a plurality of attention-weighted spatial-temporal features from the plurality of spatio-temporal features using a CNN-attention network, wherein the CNN-attention network comprises of a plurality of three-dimensional convolution layers;
   extracting a plurality of attention-weighted spatial-temporal recurrent features from the plurality of spatio-temporal recurrent features using an RNN-attention network, wherein the RNN-attention network comprises of a plurality of three-dimensional convolution layers; and
   extracting a plurality of polarization video-level features from the plurality of attention-weighted spatial-temporal recurrent features and the plurality of attention-weighted spatial-temporal features using a pooling network, wherein the pooling network comprises of a plurality of concatenation layers and a plurality of global average pooling layers.

3. The method of claim 1, wherein the spatio-temporal polarization video analysis for using the trained spatio-temporal deep network architecture for a computer vision application, comprises:
   capturing a plurality of user polarization videos using a polarization camera, via one or more hardware processors, wherein the plurality of user polarization videos comprises a plurality of pre-defined user frames, where the plurality of user pre-defined frames are associated with a plurality of pre-defined user polarization angles;
   extracting a set of user parameters from the plurality of user videos based on the parameter extraction technique, via one or more hardware processors, wherein the set of user parameters are in a video format comprising a user unpolarised intensity ($I_{un}$) video, a user stokes vector ($S_i$) video, a user degree of polarization (DoP) video and an user angle of polarization (AoP) video;

configuring the set of user parameters to obtain a configured user polarimetric video based on the configuration technique, via one or more hardware processors, wherein the configured user polarimetric video comprises one of the single configuration, the multiple-stacked configuration and the multiple-parallel configuration; and analyzing the configured user polarimetric video for the computer vision application using the trained spatio-temporal deep network architecture, via one or more hardware processors, wherein the plurality of polarization video level features is utilized by the trained spatio-temporal deep network architecture for analyzing the configured user polarimetric video for the computer vision application.

4. The method of claim 3, wherein the computer vision application comprises of at least one of an object recognition, an action recognition, a defect identification, an object tracking.

5. The method of claim 1, wherein the parameter extraction technique is one of a pixel-wise computation technique and a deep network-based estimation technique.

6. The method of claim 1, wherein the configuration technique comprises:
selecting a subset of parameters from the set of parameters based on a complexity factor associated with the computer vision application; and
arranging the subset of parameters as one of the single configuration, the multiple-stacked configuration and the multiple-parallel configuration based on a pre-defined class threshold, a pre-defined inter-class variance threshold and pre-defined intra-class variance threshold for the computer vision application.

7. A system, comprising:
a memory storing instructions;
one or more communication interfaces; and
one or more hardware processors coupled to the memory via the one or more communication interfaces, wherein the one or more hardware processors are configured by the instructions to:
capture a plurality of polarization videos using a polarization camera, via the one or more hardware processors, wherein the plurality of polarization videos comprises a plurality of pre-defined frames, where each of the plurality of pre-defined frames has a corresponding polarization angle;
extract a set of parameters from the plurality of polarization videos based on a parameter extraction technique, via the one or more hardware processors, wherein the set of parameters are in a video format comprising an unpolarised intensity ($I_{un}$) video, a stokes vector ($S_i$) video, a degree of polarization (DoP) video and an angle of polarization (AoP) video;
configure the set of parameters to obtain a configured polarimetric video based on a configuration technique, via the one or more hardware processors, wherein the configured polarimetric video comprises one of a single configuration, a multiple-stacked configuration and a multiple-parallel configuration; and
train a spatio-temporal deep network architecture using the configured polarimetric video for a spatio-temporal polarization video analysis, via the one or more hardware processors, wherein the spatio-temporal architecture is a feature extraction network comprising a neural network of a convolutional neural network and a recurrent neural network.

8. The system of claim 7, wherein the one or more hardware processors are configured by the instructions to train the spatio-temporal deep network architecture for spatio-temporal polarization video analysis to obtain a trained spatio-temporal deep network architecture, wherein the training comprises:
extracting a plurality of spatio-temporal features from the configured polarimetric video using a three-dimensional convolutional neural network (3D-CNN), wherein the 3D-CNN comprises of a three-dimensional convolution layer, a plurality of max-pooling layers, a plurality of average pooling layers and a plurality of batch normalization layers;
extracting a plurality of spatio-temporal recurrent features from the plurality of spatio-temporal features using a recurrent neural network (RNN), wherein the RNN comprises of a two-dimensional convolutional long short-term memory (convLSTM) layer;
extracting a plurality of attention-weighted spatial-temporal features from the plurality of spatio-temporal features using a CNN-attention network, wherein the CNN-attention network comprises of a plurality of three-dimensional convolution layers;
extracting a plurality of attention-weighted spatial-temporal recurrent features from the plurality of spatio-temporal recurrent features using an RNN-attention network, wherein the RNN-attention network comprises of a plurality of three-dimensional convolution layers; and
extracting a plurality of polarization video-level features from the plurality of attention-weighted spatial-temporal recurrent features and the plurality of attention-weighted spatial-temporal features using a pooling network, wherein the pooling network comprises of a plurality of concatenation layers and a plurality of global average pooling layers.

9. The system of claim 7, wherein the one or more hardware processors are configured by the instructions for spatio-temporal polarization video analysis using the trained spatio-temporal deep network architecture for a computer vision application, comprises:
capturing a plurality of user polarization videos using a polarization camera, via one or more hardware processors, wherein the plurality of user polarization videos comprises a plurality of pre-defined user frames, where the plurality of user pre-defined frames are associated with a plurality of pre-defined user polarization angles;
extracting a set of user parameters from the plurality of user videos based on the parameter extraction technique, via one or more hardware processors, wherein the set of user parameters are in a video format comprising a user unpolarised intensity ($I_{un}$) video, a user stokes vector ($S_i$) video, a user degree of polarization (DoP) video and an user angle of polarization (AoP) video;
configuring the set of user parameters to obtain a configured user polarimetric video based on the configuration technique, via one or more hardware processors, wherein the configured user polarimetric video comprises one of the single configuration, the multiple-stacked configuration and the multiple-parallel configuration; and analyzing the configured user polarimetric video for the computer vision application using the trained spatio-temporal deep network architecture, via one or more hardware processors, wherein the plurality of polarization video level features is utilized by the trained spatio-temporal deep network architecture for analyzing the configured user polarimetric video for the computer vision application.

10. The system of claim 7, wherein the one or more hardware processors are configured by the instructions for a computer vision application, wherein the computer vision application comprises of at least one of an object recognition, an action recognition, a defect identification, an object tracking.

11. The system of claim 7, wherein the one or more hardware processors are configured by the instructions to perform the parameter extraction technique, wherein the parameter extraction technique is one of a pixel-wise computation technique and a deep network-based estimation technique.

12. The system of claim 7, wherein the one or more hardware processors are configured by the instructions to perform the configuration technique, comprising:
   selecting a subset of parameters from the set of parameters based on a complexity factor associated with the computer vision application; and
   arranging the subset of parameters as one of the single configuration, the multiple-stacked configuration and the multiple-parallel configuration based on a pre-defined class threshold, a pre-defined inter-class variance threshold and pre-defined intra-class variance threshold for the computer vision application.

13. One or more non-transitory machine-readable information storage mediums comprising one or more instructions which when executed by one or more hardware processors cause:
   capturing a plurality of polarization videos using a polarization camera, wherein the plurality of polarization videos comprises a plurality of pre-defined frames, where each of the plurality of pre-defined frames has a corresponding polarization angle;
   extracting a set of parameters from the plurality of polarization videos based on a parameter extraction technique, wherein the set of parameters are in a video format comprising an unpolarised intensity ($I_{un}$) video, a stokes vector ($S_i$) video, a degree of polarization (DoP) video and an angle of polarization (AoP) video;
   configuring the set of parameters to obtain a configured polarimetric video based on a configuration technique, wherein the configured polarimetric video comprises one of a single configuration, a multiple-stacked configuration and a multiple-parallel configuration; and
   training a spatio-temporal deep network architecture using the configured polarimetric video for a spatio-temporal polarization video analysis, wherein the spatio-temporal architecture is a feature extraction network comprising a neural network of a convolutional neural network and a recurrent neural network.

* * * * *